United States Patent
Chiu et al.

(10) Patent No.: US 9,048,990 B2
(45) Date of Patent: Jun. 2, 2015

(54) POWER EFFICIENT PAGING CHANNEL DECODING

(75) Inventors: Sean (Fu-Hsuan) Chiu, Fords, NJ (US); Nick (Zhijun) Gong, Holmdel, NJ (US)

(73) Assignee: Broadcom Corporation, Irvine, CA (US)

( * ) Notice: Subject to any disclaimer, the term of this patent is extended or adjusted under 35 U.S.C. 154(b) by 429 days.

(21) Appl. No.: 13/404,147

(22) Filed: Feb. 24, 2012

(65) Prior Publication Data

US 2013/0143605 A1 Jun. 6, 2013

Related U.S. Application Data

(60) Provisional application No. 61/565,864, filed on Dec. 1, 2011, provisional application No. 61/568,868, filed on Dec. 9, 2011.

(51) Int. Cl.
*H04Q 7/20* (2006.01)
*H04L 1/00* (2006.01)

(52) U.S. Cl.
CPC .............. *H04L 1/0054* (2013.01); *Y02B 60/50* (2013.01)

(58) Field of Classification Search
USPC .......................................... 370/509, 447, 471
See application file for complete search history.

(56) References Cited

U.S. PATENT DOCUMENTS

| | | | |
|---|---|---|---|
| 6,643,318 B1 | 11/2003 | Parsa et al. | |
| 7,058,043 B2 * | 6/2006 | Birdwell et al. | ............ 370/349 |
| 7,957,758 B2 | 6/2011 | Soerensen et al. | |
| 8,179,946 B2 | 5/2012 | Roberts et al. | |
| 8,320,318 B2 | 11/2012 | Baker et al. | |
| 8,670,509 B2 | 3/2014 | Sollenberger et al. | |
| 2001/0040916 A1 | 11/2001 | Sato | |
| 2004/0081115 A1 | 4/2004 | Parsa et al. | |
| 2004/0199858 A1 | 10/2004 | Becker et al. | |
| 2004/0264497 A1 | 12/2004 | Wang et al. | |
| 2005/0113087 A1 * | 5/2005 | Rick et al. | ................. 455/434 |
| 2007/0165567 A1 | 7/2007 | Tan et al. | |
| 2007/0243848 A1 | 10/2007 | Behzad | |
| 2008/0298325 A1 | 12/2008 | Vujcic | |
| 2009/0175205 A1 | 7/2009 | Mathew et al. | |
| 2009/0207746 A1 | 8/2009 | Yuan et al. | |
| 2009/0225918 A1 | 9/2009 | Telukuntla et al. | |
| 2009/0252125 A1 | 10/2009 | Vujcic | |

(Continued)

FOREIGN PATENT DOCUMENTS

| | | |
|---|---|---|
| EP | 1489863 A2 | 12/2004 |
| EP | 2111693 A1 | 10/2009 |

OTHER PUBLICATIONS

Korean Office Action in co-pending, related Korean Application No. 10-2012-0105014 mailed Nov. 28, 2013.

(Continued)

*Primary Examiner* — Kwasi Karikari
*Assistant Examiner* — Randy Peaches
(74) *Attorney, Agent, or Firm* — McDermott Will & Emery LLP

(57) ABSTRACT

Disclosed are various embodiments of extracting a paging message from paging channel downlink communications. A first and second page bursts and received. When the signal to noise ratio of the first and second bursts exceeds a threshold, a Viterbi decoder is executed and an error checking code calculated to determine whether the paging message is successfully extracted. If not, a third page burst is received and a Viterbi decoder executed to extract the paging message.

20 Claims, 4 Drawing Sheets

(56) References Cited

U.S. PATENT DOCUMENTS

| | | |
|---|---|---|
| 2011/0064122 A1 | 3/2011 | Hahm et al. |
| 2012/0134293 A1 | 5/2012 | Nistor et al. |
| 2013/0141257 A1 | 6/2013 | Chiu et al. |
| 2013/0142057 A1 | 6/2013 | Molev-Shteiman |
| 2013/0142061 A1 | 6/2013 | Kuo et al. |
| 2013/0142223 A1 | 6/2013 | Kuo |
| 2013/0143554 A1 | 6/2013 | Hahm et al. |
| 2013/0143577 A1 | 6/2013 | Chiu et al. |
| 2013/0301581 A1 | 11/2013 | Johansson et al. |
| 2013/0322386 A1 | 12/2013 | Zhang et al. |

OTHER PUBLICATIONS

Dielissen, et al., "State Vector Reduction for Initailization of Sliding Windows Map," Proc 2nd International Symposium on Turbo Codes & Related Topics, Sep. 2000, pp. 387-390.

* cited by examiner

POWER EFFICIENT PAGING CHANNEL DECODING

CROSS-REFERENCE TO RELATED APPLICATIONS

This application claims priority to U.S. provisional application Ser. No. 61/565,864, entitled "Cellular Baseband Processing," filed Dec. 1, 2011, which is incorporated herein by reference in its entirety. This application also claims priority to U.S. Provisional application Ser. No. 61/568,868, entitled "Cellular Baseband Processing," filed Dec. 9, 2011, which is incorporated herein by reference in its entirety.

BACKGROUND

Cellular wireless communication systems support wireless communication services in many populated areas of the world. While cellular wireless communication systems were initially constructed to service voice communications, they are now called upon to support data communications as well. The demand for data communication services has exploded with the acceptance and widespread use of the Internet. While data communications have historically been serviced via wired connections, cellular wireless users now demand that their wireless units also support data communications. Many wireless subscribers now expect to be able to "surf" the Internet, access their email, and perform other data communication activities using their cellular phones, wireless personal data assistants, wirelessly linked notebook computers, and/or other wireless devices. The demand for wireless communication system data communications will only increase with time. Thus, cellular wireless communication systems are currently being created/modified to service these burgeoning data communication demands.

Cellular wireless networks include a "network infrastructure" that wirelessly communicates with wireless terminals and/or mobile devices within a respective service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC). Each BSC also typically directly or indirectly couples to the Internet.

In operation, each base station communicates with a plurality of wireless terminals operating in its cell/sectors. A BSC coupled to the base station routes voice communications between the MSC and a serving base station. The MSC routes voice communications to another MSC or to the PSTN. Typically, BSCs route data communications between a servicing base station and a packet data network that may include and/or couple to the Internet. Transmissions from base stations to wireless terminals are referred to as "forward link" transmissions while transmissions from wireless terminals to base stations are referred to as "reverse link" transmissions. The volume of data transmitted on the forward link typically exceeds the volume of data transmitted on the reverse link. Such is the case because data users typically issue commands to request data from data sources, e.g., web servers, and the web servers provide the data to the wireless terminals.

Wireless links between base stations and their serviced wireless terminals typically operate according to one (or more) of a plurality of operating standards. These operating standards define the manner in which the wireless link may be allocated, setup, serviced and torn down. One popular cellular standard is the Global System for Mobile telecommunications (GSM) standard. The GSM standard, or simply GSM, is predominant in Europe and is in use around the globe. While GSM originally serviced only voice communications, it has been modified to also service data communications. In GSM, wireless terminals are informed of the need to service incoming communications via pages from base stations to the wireless terminals. GSM General Packet Radio Service (GPRS) operations and the Enhanced Data rates for GSM (or Global) Evolution (EDGE) operations coexist with GSM by sharing the channel bandwidth, slot structure, and slot timing of the GSM standard. GPRS operations and EDGE operations may also serve as migration paths for other standards as well, e.g., IS-136 and Pacific Digital Cellular (PDC).

To conserve power, the wireless terminal may sleep when not actively communicating with a servicing base station. However, to ensure no communications are missed, the wireless terminal awakens periodically to receive a page burst that indicates if the wireless terminal must service a communication from the servicing base station processing operations are often scheduled to follow the receipt of a page. Since the operations are scheduled prior to the actual knowledge of the information contained within the page, these processing operations are often divided to be performed following multiple pages. To make this determination, the wireless terminal typically expends significant battery power and processing resources to decode the page burst to determine whether the wireless terminal was paged and perform scheduled processing operations. Thus, there exists a need for wireless terminals that can efficiently decode page bursts so as to limit power consumption.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Embodiments of the present disclosure are directed to reducing power consumption of a GSM (Group System for Mobile Communications) mobile device and/or wireless terminal. More specifically, the embodiments described herein can reduce power consumption of a device that is associated with decoding paging channel (PCH) downlink transmissions from a base station in a GSM environment. PCH downlink transmissions typically comprise four paging bursts that are received from a base station. A mobile device (or each subscriber identification module (SIM) within a mobile device supporting multiple SIM's) can assigned one or more slots in each of the four paging bursts that contain paging information intended for the mobile device. PCH downlink transmissions can be encoded using a ½ rate convolutional encoding scheme where the data intended for a specific device is encoded across the four paging bursts along with a cyclic redundancy check (CRC) value for error checking purposes. Accordingly, embodiments of the present disclosure allow for extraction of paging information encoded in PCH downlink transmissions by processing less than the four paging bursts, thereby reducing power consumption of a mobile device when it receives PCH downlink transmissions.

Figure 1:
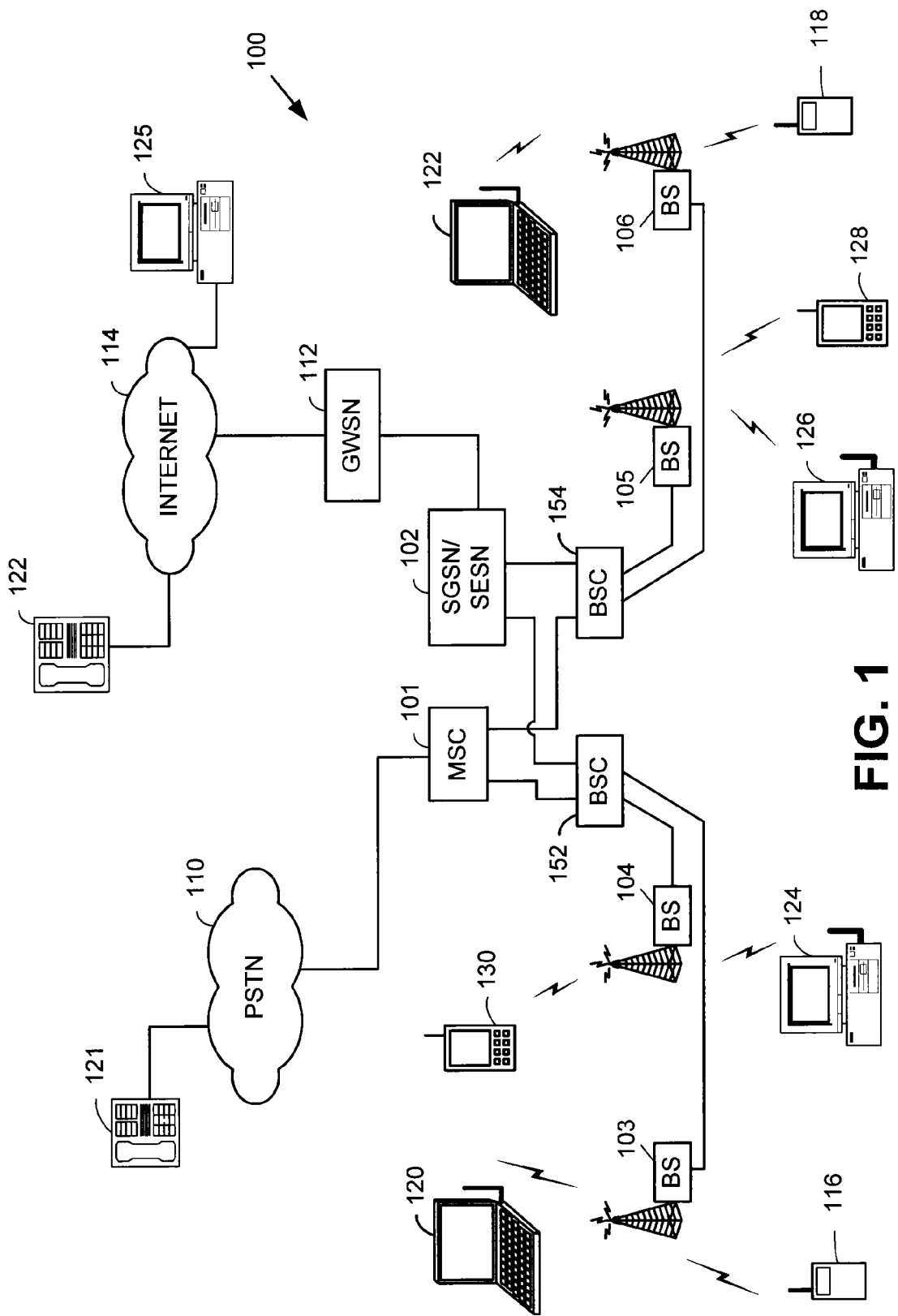
FIG. 1 is a system diagram illustrating a portion of a wireless communication system that supports mobile devices and/or wireless terminals operating according to the present invention.

FIG. 1 is a system diagram illustrating a portion of a cellular wireless communication system 100 that supports wireless terminals operating according to the present invention. The cellular wireless communication system 100 includes a Mobile Switching Center (MSC) 101, Serving GPRS Support Node/Serving EDGE Support Node (SGSN/SESN) 102, base station controllers (BSCs) 152 and 154, and base stations 103, 104, 105, and 106. The SGSN/SESN 102 couples to the Internet 114 via a GPRS Gateway Support Node (GGSN) 112. A conventional voice terminal 121 couples to the PSTN 110. A Voice over Internet Protocol (VoIP) terminal 123 and a personal computer 125 couple to the Internet 114. The MSC 101 couples to the Public Switched Telephone Network (PSTN) 110.

Each of the base stations 103-106 services a cell/set of sectors within which it supports wireless communications. Wireless links that include both forward link components and reverse link components support wireless communications between the base stations and their serviced wireless terminals. These wireless links support digital data communications, VoIP communications, and other digital multimedia communications. The cellular wireless communication system 100 may also be backward compatible in supporting analog operations as well. The cellular wireless communication system 100 supports the Global System for Mobile telecommunications (GSM) standard and also the Enhanced Data rates for GSM (or Global) Evolution (EDGE) extension thereof. The cellular wireless communication system 100 may also support the GSM General Packet Radio Service (GPRS) extension to GSM. However, the present invention is also applicable to other standards as well, e.g., TDMA standards, CDMA standards, etc. In general, the teachings of the present invention apply to digital communications that combine Automatic Repeat ReQuest (ARQ) operations at Layer 2, e.g., LINK/MAC layer with variable coding/decoding operations at Layer 1 (PHY).

Wireless terminals 116, 118, 120, 122, 124, 126, 128, and 130 couple to the cellular wireless communication system 100 via wireless links with the base stations 103-106. As illustrated, wireless terminals may include cellular telephones 116 and 118, laptop computers 120 and 122, desktop computers 124 and 126, and data terminals 128 and 130. However, the cellular wireless communication system 100 supports communications with other types of wireless terminals as well. As is generally known, devices such as laptop computers 120 and 122, desktop computers 124 and 126, data terminals 128 and 130, and cellular telephones 116 and 118, are enabled to "surf" the Internet 114, transmit and receive data communications such as email, transmit and receive files, and to perform other data operations. Many of these data operations have significant download data-rate requirements while the upload data-rate requirements are not as severe. Some or all of the wireless terminals 116-130 are therefore enabled to support the GPRS and/or EDGE operating standard as well as supporting the voice servicing portions the GSM standard.

Figure 2:
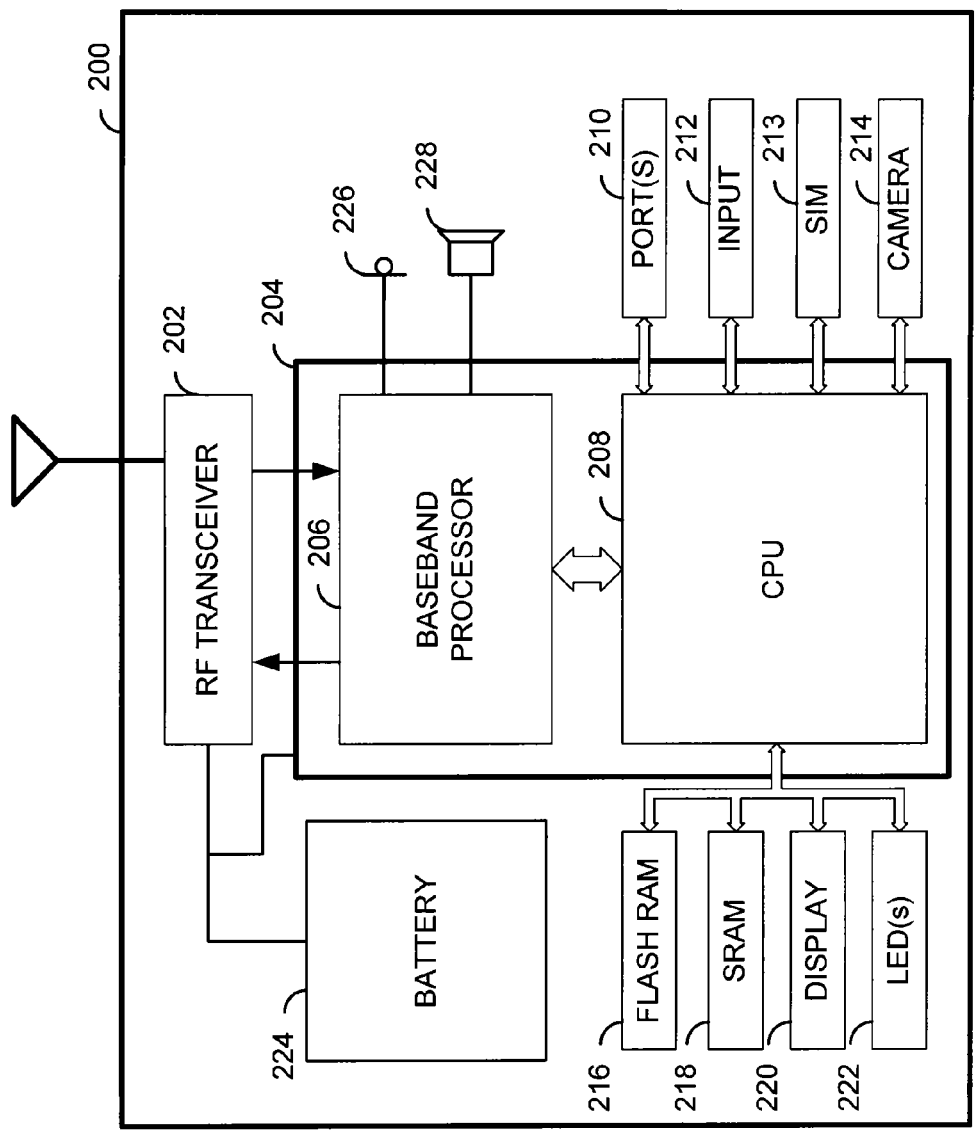
FIG. 2 is a block diagram functionally illustrating a mobile device according to an embodiment of the disclosure.

FIG. 2 is a block diagram functionally illustrating a mobile device 200 constructed according to the present invention. The mobile device 200 of FIG. 2 includes an RF transceiver 202, a baseband processor 206, a central processing unit (CPU) 208, and various other components contained within a housing. The baseband processor 206 can perform physical layer processing, include a speech COder/DECoder, and other baseband functions that interact with the RF transceiver 202. In one embodiment, the baseband processor 206 can comprise a Digital Signal Processor (DSP). The CPU 208 can interact with data provided by the baseband processor 206, which represents decoded information received via the RF transceiver 202 as well as interact with the various other systems and components in the mobile device 200, such as a display 220, microphone 226, speaker 228, user input device 212, camera 214, LED's 222 and other components as can be appreciated that might be incorporated into a mobile device. The user input device 212 can include a capacitive touchscreen that is integrated within the display 220, a keypad, other buttons or switches integrated into the mobile device 200, or any other user input device as can be appreciated.

The mobile device 200 can also include a battery 224 or other power source that can provide power to the various components in the terminal. The terminal can also include one or more Subscriber Identification Module (SIM) port 213, a flash RAM 216, an SRAM 218, or other system resources. The mobile device 200 can also include one or more ports 210, which can comprise a universal serial bus (USB) port and its variants (e.g., micro-USB, mini-USB, etc.), a proprietary port, or any other input/output ports that can provide for data operations as well as power supply that can facilitate charging of the battery 224.

Figure 3:
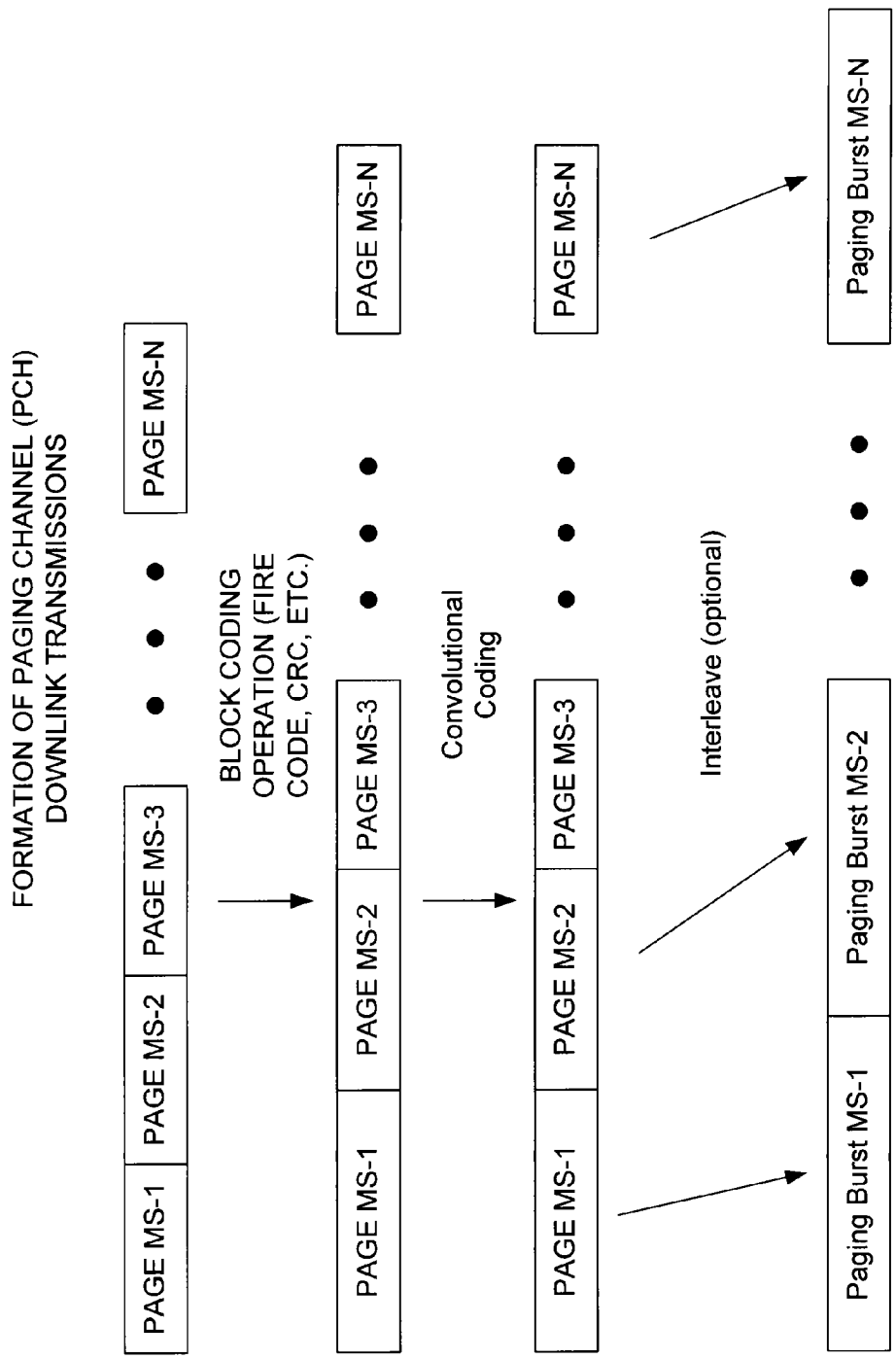
FIG. 3 is a block diagram illustrating the formation of paging channel downlink transmissions.

FIG. 3 depicts the various stages associated with forming and interpreting paging channel (PCH) downlink transmissions. The original pages for the individual wireless terminals or mobile stations are initially divided into a series of pages to be transmitted according to a predetermined schedule to the wireless terminals. This predetermined schedule allows the individual wireless terminals, when not actively transmitting, to enter a sleep mode and merely awaken when it is necessary to receive their respective page bursts. A wireless terminal is designated a particular slot from a page bursts, which is extracted and processed to retrieve a paging message associated with the device. As shown here, the original page undergoes two stages of encoding. First, the original pages undergo a block coding operation that is typically referred to as outer encoding. The block coding stage, allows for the detection of errors within the data block. In addition, the Data blocks may be supplemented with tail bits or block code sequence. Since Block Coding is the first or external stage of channel coding, the block code is also known as an external or outer encoding scheme. Typically, two kinds of codes are used, a cyclic redundancy check (CRC) or a Fire Code. The Fire Codes allow for either error correction or error detection. Error detection with the Fire Code, verifies connectivity.

Next, the pages undergo a second level of encoding that typically is a convolutional coding referred to as inner encoding. The pages may be optionally interleaved to form paging bursts. These paging bursts are what the wireless terminal receives according to the predetermined schedule. Typically, four paging bursts make up every paging message and in many prior art embodiments, all four or three paging bursts must be received before decoding begins.

In order to reduce power consumption of a mobile device 200 according to an embodiment of the disclosure, the baseband processor of a mobile device 200 can attempt to extract a page, or an encoded signal, by processing less than the four paging bursts. A paging message can be extracted from a signal encoded using a convolutional coding scheme (e.g., ½ rate convolutional code) in the paging bursts by employing a Viterbi decoder. Accordingly, as the signal to noise ratio (SNR) of the received paging bursts increase, the probability of successfully extracting the encoded signal also increases.

Therefore, if the SNR of the first and second received paging bursts in a paging message exceed a given threshold, the baseband processor 206 of the mobile terminal can execute a Viterbi decoder and attempt to extract the paging message from the first and second received paging bursts. In this scenario, the baseband processor 206 can forego receiving the third and/or fourth paging bursts if the paging message is successfully extracted from the first and second paging bursts. In this way, the baseband processor 206 avoids the power consumption implications and penalty associated with receiving and/or processing the third and/or fourth paging bursts because the paging message has been extracted without the third and fourth paging bursts. These power consumption implications include the power required for the RF transceiver 202 to activate and receive the third and/or fourth paging bursts as well as potentially perform an analog to digital conversion of the signal as well as any other potentially power consuming RF operations The correctness of the extracted paging message can be verified by calculating a cyclic redundancy check (CRC) code or other error checking code for the extracted paging message and comparing the calculated value with one that is embedded in the paging message itself. If there is a mismatch, the baseband processor 206 can then direct the RF transceiver 202 to receive the third paging burst. The baseband processor 206 can then execute a Viterbi decoder on the first, second, and third paging bursts in an attempt to extract the paging message. The baseband processor 206 can then perform error checking (e.g., compare a calculated error checking value with one embedded in one that is extracted from the decoded paging message) to determine whether the paging message has been correctly extracted.

Accordingly, the power consumption associated with an embodiment of the disclosure that attempts to first extract a paging message using only the first and second paging message before receiving the third paging burst can be related to the following formulation, which expresses the significant power consuming operations involved in receiving and decoding a paging message. In the following formulation, $P_v$, is the power consumption associated with execution of the Viterbi decoder, $P_b$ is the power consumption associated with receiving a paging burst using the RF transceiver in the mobile device 200, and α is the probability that, for a given SNR, extraction of the paging message using only two paging bursts will fail:

$$(2P_b+P_v)(1-\alpha)+\alpha(3P_b+2P_v)$$

The expression $(2P_b+P_v)(1-\alpha)$ is related to the power consumption associated with receiving and processing two paging bursts to extract a paging message. The expression $\alpha(3P_b+2P_v)$ is related to the power consumption associated with receiving and processing three paging bursts to extract the paging message when the error checking code calculated by the baseband processor 206 does not match the embedded error checking code from the extracted paging message. In the latter scenario, the Viterbi decoder is executed twice because it must be executed a second time in order to extract the paging message using the first paging burst, the second paging burst, and the third paging after a failure associated with using only the first two paging bursts.

The power consumption associated with many prior art embodiments, where three paging bursts are received and used to extract the paging message can be related to the following formulation:

$$3P_b+P_v$$

As can be seen in the above formulations, in situations where a very low probability α exists that extraction of the paging message using only two bursts fails, the power consumption associated with an embodiment of the disclosure is lower than the power consumption of prior art embodiments. Such a probability is generally very low in high SNR environments. Therefore, embodiments of the disclosure can also assess a SNR of the first and second paging bursts to avoid the power consumption penalty associated with executing a Viterbi decoder a second time with the third paging burst after a failure of properly extracting the paging message using only the first and second bursts. In other words, a SNR threshold can be employed, and when the SNR of the first and second bursts exceed this threshold, the baseband processor 206 can attempt to extract a paging message using only the first and second bursts, which probabilistically yields lower power consumption even when this extraction fails, particularly when the probability of failure is very low.

Figure 4:
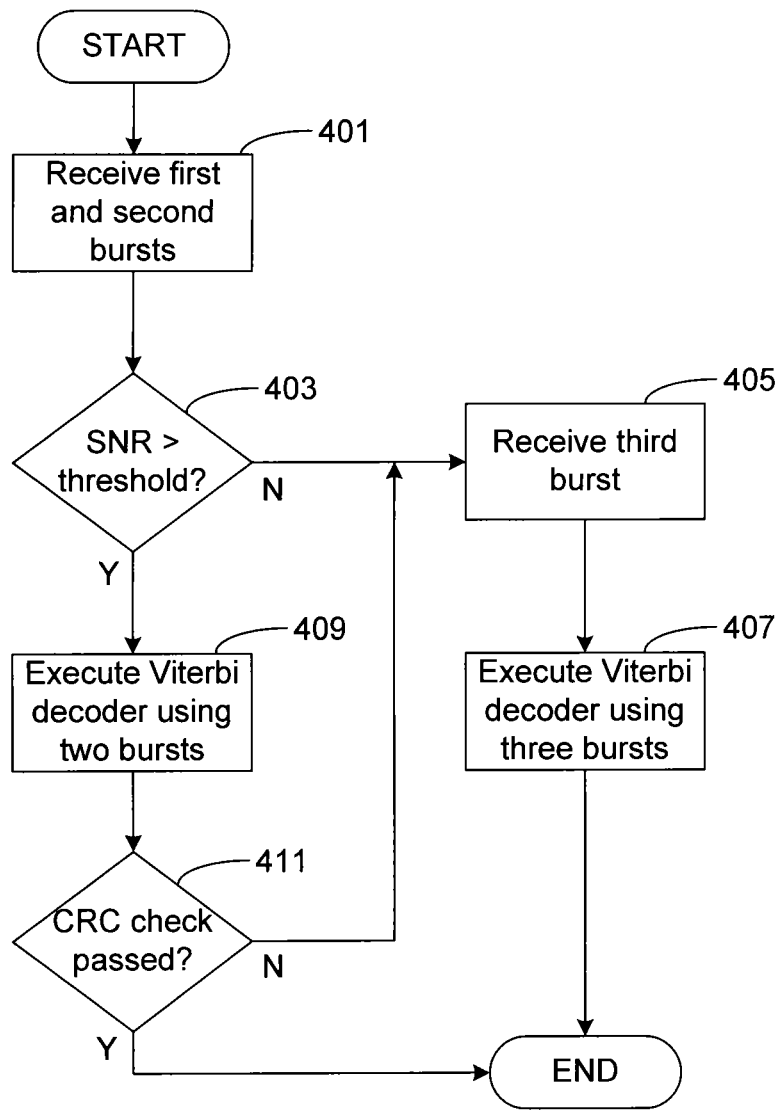
FIG. 4 is a flow chart illustrating operation of a mobile in receiving and processing paging bursts according to an embodiment of the disclosure.

With reference to FIG. 4, shown is a flowchart that provides one example of the operation of the mobile device 200 according to various embodiments. Alternatively, the flowchart of FIG. 4 may be viewed as implementing various steps of a method to process a paging bursts associated with a paging channel by an RF transceiver, baseband processor, and/or other components in a mobile device 200.

In box 401, the mobile device 200 can receive first and second burst from a paging channel. In box 403, the baseband processor 206 can determine whether the SNR of the first paging burst and second paging burst exceed a threshold. In other words, the baseband processor 206 can determine whether the first and second bursts are received with low noise levels. The threshold can be associated with a probability that extraction of a paging message using the first and second bursts with a Viterbi decoder fails given a SNR value.

In box 405, if the SNR of the first and second bursts does not exceed the threshold, the baseband processor 206 can initiate receipt of the third paging bursts by the RF transceiver 202 of the mobile device 200. In box 407, the baseband processor 206 can execute a Viterbi decoder to extract a paging message, or encoded signal, using the first paging burst, the second paging burst, and the third paging burst.

In box 405, if the SNR of the first and second bursts exceeds the threshold, then in box 409, the baseband processor 206 executes a Viterbi decode to attempt to extract a paging message from the first paging burst and second paging burst. In box 411, the baseband processor 206 determines whether an error checking code embedded in the extracted data matches an error checking code calculated by the baseband processor 206. Such an error checking code can comprise a CRC code. The mobile device 200 may then re-enter a sleep mode for a predetermined period of time until a next paging message is received.

It should be emphasized that the above-described embodiments of the present invention are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A wireless communication device, comprising:
   at least one radio frequency (RF) transceiver configured to receive a first encoded paging burst and a second encoded paging burst;
   a baseband processor configured to:
      identify a first signal to noise ratio of the first encoded paging burst; identify a second signal to noise ratio of the second encoded paging bust;
      extract a first encoded signal from the first encoded paging burst and the second encoded paging burst when the first signal to noise ratio and the second signal to noise ratio exceed a predefined threshold;
      calculate an error checking value associated with the first encoded signal; determine whether an embedded error checking value decoded from the first encoded signal matches the error checking value; and
      initiate processing of a third encoded paging burst when the error checking value does not match the embedded error checking value.

2. The system of claim 1, wherein the baseband processor is configured to extract the first encoded signal from the first encoded paging burst and the second encoded paging burst by executing a Viterbi decoder.

3. The system of claim 1, wherein the baseband processor is further configured to:
   initiate processing of a third encoded paging burst when the error checking value does not match the embedded error checking value; and
   extract a second encoded signal from the first encoded paging burst, the second encoded paging burst, and the third encoded paging burst.

4. The system of claim 1, wherein the baseband processor is further configured to:
   initiate processing of a third encoded paging burst when at least one of the first signal to noise ratio and the second signal to noise ratio does not exceed the threshold; and
   extract a second encoded signal from the first encoded paging burst, the second encoded paging burst, and the third encoded paging burst.

5. The system of claim 4, wherein the baseband processor is configured to extract the second encoded signal from the first encoded paging burst, the second encoded paging burst, and the third encoded paging burst by executing a Viterbi decoder.

6. The system of claim 1, wherein the encoded signal is encoded using a ½ rate convolutional code.

7. The system of claim 1, wherein the first paging burst and the second paging burst are received in a Group System Mobile (GSM) paging channel.

8. The system of claim 1, wherein the threshold is based at least in part upon a probability that the embedded error checking value decoded from the first encoded signal matches the error checking value.

9. The system of claim 1, wherein the embedded error checking value decoded from the first encoded signal further comprises a cyclic redundancy check code based upon the first encoded signal.

10. A method executed in a wireless terminal for extracting an encoded signal from a wireless signal, comprising the steps of:
    receiving a first encoded paging burst and a second encoded paging burst;
    identifying a first signal to noise ratio of the first encoded paging burst;
    identifying a second signal to noise ratio of the second encoded paging bust;
    extracting a first encoded signal from the first encoded paging burst and the second encoded paging burst when the first signal to noise ratio and the second signal to noise ratio exceed a predefined threshold;
    calculating an error checking value associated with the first encoded signal;
    determining whether an embedded error checking value decoded from the first encoded signal matches the error checking value; and
    initiating processing of a third encoded paging burst when the error checking value does not match the embedded error checking value.

11. The method of claim 10, wherein the step of extracting the first encoded signal from the first encoded paging burst and the second encoded paging further comprises executing a Viterbi decoder on a designated slot of the first encoded paging burst and a corresponding designated slot of the second encoded paging burst.

12. The method of claim 10, further comprising the steps of:
    initiating processing of a third encoded paging burst when the error checking value does not match the embedded error checking value; and
    extracting a second encoded signal from the first encoded paging burst, the second encoded paging burst, and the third encoded paging burst.

13. The method of claim 10, further comprising the steps of:
    initiating processing of a third encoded paging burst when at least one of the first signal to noise ratio and the second signal to noise ratio does not exceed the threshold; and
    extracting a second encoded signal from a designated slot of the first encoded paging burst, the second encoded paging burst, and the third encoded paging burst.

14. The method of claim 13, further comprising the step of extracting the second encoded signal from the first encoded paging burst, the second encoded paging burst, and the third encoded paging burst by executing a Viterbi decoder.

15. The method of claim 10, wherein the encoded signal is encoded using a ½ rate convolutional code.

16. The method of claim 10, wherein the first paging burst and the second paging burst are received in a Group System Mobile (GSM) paging channel.

17. The method of claim 10, wherein the threshold is based at least in part upon a probability that the embedded error checking value decoded from the first encoded signal matches the error checking value.

18. The method of claim 10, wherein the embedded error checking value decoded from the first encoded signal further comprises a cyclic redundancy check code based upon the first encoded signal.

19. A computer program product comprising instructions stored in a non-transitory computer-readable storage medium, the instructions, comprising:
    instructions to receive a first encoded paging burst and a second encoded paging burst;
    instructions to identify a first signal to noise ratio of the first encoded paging burst;
    instructions to identify a second signal to noise ratio of the second encoded paging bust;
    instructions to extract a first encoded signal from the first encoded paging burst and the second encoded paging burst exclusively when the first signal to noise ratio and the second signal to noise ratio exceed a predefined threshold;

instructions to calculate an error checking value associated with the first encoded signal;

instructions to determine whether an embedded error checking value decoded from the first encoded signal matches the error checking value; and instructions to initiate processing of a third encoded paging burst exclusively when the error checking value does not match the embedded error checking value.

20. The computer program product of claim 19, the instructions further comprising:

instructions to initiate processing of a third encoded paging burst when the error checking value does not match the embedded error checking value; and instructions to extract a second encoded signal from the first encoded paging burst, the second encoded paging burst, and the third encoded paging burst.

* * * * *